United States Patent
Cobden et al.

(10) Patent No.: US 11,312,635 B2
(45) Date of Patent: Apr. 26, 2022

(54) PRODUCTIVITY OF EQUILIBRIUM-RESTRICTED REACTIONS

(71) Applicant: Nederlandse Organisatie voor toegepast-natuurwetenschappelijk Onderzoek TNO, The Hague (NL)

(72) Inventors: Paul Dean Cobden, The Hague (NL); Rudie Johan Hendrik Grisel, The Hague (NL); Jurriaan Boon, The Hague (NL)

(73) Assignee: Nederlandse Organisatie voor toegepast-natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/264,337

(22) PCT Filed: Aug. 2, 2019

(86) PCT No.: PCT/EP2019/070928
§ 371 (c)(1),
(2) Date: Jan. 29, 2021

(87) PCT Pub. No.: WO2020/025810
PCT Pub. Date: Feb. 6, 2020

(65) Prior Publication Data
US 2021/0292178 A1   Sep. 23, 2021

(30) Foreign Application Priority Data

Aug. 2, 2018 (EP) .................................. 18187054

(51) Int. Cl.
*B01J 19/00* (2006.01)
*B01J 19/24* (2006.01)
*B01J 20/18* (2006.01)
*C01C 1/04* (2006.01)

(52) U.S. Cl.
CPC .......... *C01C 1/0417* (2013.01); *B01J 19/0006* (2013.01); *B01J 19/245* (2013.01); *B01J 20/18* (2013.01); *B01J 2219/00186* (2013.01)

(58) Field of Classification Search
CPC ...... B01J 19/00; B01J 19/0053; B01J 19/006; B01J 19/24; B01J 19/245; B01J 20/00; B01J 20/02; B01J 20/10; B01J 20/16; B01J 20/18; B01J 2219/00; B01J 2219/00049; B01J 2219/00186; C01C 1/00; C01C 1/02; C01C 1/04; C01C 1/0405; C01C 1/0417
See application file for complete search history.

(56) References Cited

U.S. PATENT DOCUMENTS

| | | |
|---|---|---|
| 4,537,760 A | 8/1985 | Lavie |
| 5,523,326 A | 6/1996 | Dandekar et al. |
| 5,968,232 A | 10/1999 | Whitlock |
| 9,358,495 B2 | 6/2016 | Carriere et al. |
| 2015/0125377 A1* | 5/2015 | Himstedt ................ C01C 1/006 423/359 |
| 2015/0251918 A1 | 10/2015 | Nurse et al. |

FOREIGN PATENT DOCUMENTS

| | | |
|---|---|---|
| EP | 1344561 A1 | 9/2003 |
| GB | 2145702 A | 4/1985 |
| WO | 2006034765 A1 | 4/2006 |
| WO | 2017025272 A1 | 2/2017 |
| WO | 2017132773 A1 | 8/2017 |

* cited by examiner

*Primary Examiner* — Natasha E Young
(74) *Attorney, Agent, or Firm* — N.V. Nederlandsch Octrooibureau

(57) ABSTRACT

A process for increasing the productivity of equilibrium-restricted reactions and for increasing the productivity of a target compound includes the steps of (a) providing a reaction mixture comprising reactants; (b) subjecting the reaction mixture to the equilibrium reaction in a reactor or sequence of reactors, to obtain a reactor outlet mixture comprising the target compound and at least one of the reactants; (c) regenerating the loaded sorbent obtained in step (e), by flushing the loaded sorbent with the reactor outlet mixture originating from step (b), to obtain regenerated sorbent and an effluent comprising desorbed product; (d) separating the effluent originating from step (c) into a product stream and a reactant stream; and (e) a sorption step to obtain a loaded sorbent and a depleted mixture.

12 Claims, No Drawings

PRODUCTIVITY OF EQUILIBRIUM-RESTRICTED REACTIONS

FIELD OF THE INVENTION

The present invention relates to a process for increasing the productivity of equilibrium-restricted reactions, such as the production of ammonia or methanol.

BACKGROUND ART

Ammonia ($NH_3$) is an industrial bulk chemical, with a worldwide production of 176 million ton in 2014. It is produced by the Haber-Bosch process, which converts nitrogen to ammonia by reaction with hydrogen, using a metal catalyst, according to reaction (1):

$$N_2 + 3H_2 \leftrightarrow 2NH_3 \quad (1)$$

The reaction is equilibrium-restricted, given only about 10 to 20% conversion in a single pass through the reactor. Hence, a large recycle to the reactor is required in order to increase ammonia yield. Furthermore, the synthesis of ammonia requires high temperatures (about 300-550° C.) and pressures (about 150-250 bar), which makes ammonia production the highest energy consuming process in chemical industry. Recent advances in ammonia synthesis are in the field of catalyst optimization and the use of multiple reactors in series. For example, US 2015/0251918 describes conventional ammonia synthesis using multiple ammonia synthesis reactors and ammonia separation stages.

Examples of other equilibrium-restricted syntheses include the production of methanol, methane, ammonium carbamate, urea, long chain paraffin, Fischer Tropsch products and carbon monoxide. WO 2017/025272 describes a state of the art process for the production of methanol from synthesis gas, wherein a first reactor is fed with a make-up gas and the product of this reactor is, together with a recycle stream, fed to a second reactor.

There is a need in the art to optimize equilibrium-restricted reactions, such as the synthesis of ammonia or methanol, such that the single pass conversion is increased and smaller recycles are needed.

SUMMARY OF THE INVENTION

The inventors have developed a process for increasing the productivity of equilibrium-restricted reactions. The productivity of such reactions is hampered by the equilibrium that is established. No more product can be formed than allowed for by the equilibrium that applies at the conditions in the reactor. To boost conversion of the reactants towards products, downstream separation of the starting materials and product(s) is required, and the starting materials are recycled to the entrance of the reactor. Typically, a reactant mixture is introduced into the reactor, which mixture contains at least the starting materials of the equilibrium reaction. The recycle is mixed with the reactant mixture prior to introduction in the reactor, or both are introduced simultaneously at the entrance of the reactor, such that the reaction mixture within the reactor contains the components from the reactant mixture and from the recycle. Because of incomplete separation, in conventional processes the recycle contains significant amounts of the product(s) of the equilibrium reaction, which reduces the conversion in the reactor.

The process according to the present invention involves a sorption step, wherein the product mixture or intermediate reaction mixture is contacted to a sorbent selective for one or more of the products of the equilibrium reaction, and a regeneration step which employs the reactor off gases for regenerating the loaded sorbent. The process of the invention enables efficient heat management, wherein reactor temperature is efficiently employed for regeneration. Furthermore, the process according to the invention increases the single pass conversion of a target compound and reduces the costs of operating the complete process. The additional costs associated with operating a sorption and regeneration step is only minimal, because no additional heating of cooling steps are required, but the separation step can be operated at significantly less stringent conditions. For examples, the inventors found that a condenser used as means for separation could operate at 30° C. instead of −5° C., while the overall conversion of the process remained the same or even increased. Further advantages of the process according to the invention that is associated with the increased conversion are that the productivity of existing reactors can be increased, e.g. when those are retrofitted with the process according to the invention including a sorption column, or that new reactors can be decreased in size while achieving the same productivity as larger prior art reactors. As neither the reactors themselves, nor the configuration of the system, needs adaptation, existing reactors are readily retrofitted with the process according to the invention, wherein a sorption column is installed at the appropriate location in the system.

Preferred embodiments of the process according to the invention are listed here below:

1. A process for increasing the productivity of a target compound via an equilibrium reaction, wherein one or more reactants are in equilibrium with one or more products, one of which being the target compound, the process comprising:
   (a) providing a feed gas to form a reaction mixture comprising reactants;
   (b) subjecting the reaction mixture to the equilibrium reaction in a reactor or sequence of reactors, to obtain a reactor outlet mixture comprising the target compound and at least one of the reactants;
   (c) regenerating the loaded sorbent obtained in step (e), by flushing the loaded sorbent with the reactor outlet mixture originating from step (b), to obtain regenerated sorbent and an effluent comprising desorbed product of the equilibrium reaction.
   (d) separating the effluent originating from step (c) into a product stream comprising the target compound and a reactant stream comprising the reactants and at least one product of the equilibrium reaction;
   (e) a sorption step, wherein
     (i) the reactant stream originating from step (d); and/or
     (ii) an intermediate reaction mixture, which is obtained at the outlet of a reactor not being the last reactor of the reactor sequence, prior to being subjected to the subsequent reactor of the reactor sequence,
   is contacted with a sorbent selective for one or more of the products of the equilibrium reaction, to obtain a sorbent loaded with the one or more of the products of the equilibrium reaction and a depleted mixture that, in case step (e) is performed on the intermediate reaction mixture, is subjected to the subsequent reactor of the reactor sequence.
2. The process according to embodiment 1, wherein the reactant stream originating from step (d) or the depleted mixture originating from step (e) is a recycle stream which is mixed with the feed gas in step (a) to form the reaction mixture.

3. The process according to embodiment 1 or 2, wherein the sorption step (e) is performed on the reactant stream prior to step (a).
4. The process according to embodiment 1 or 2, wherein the sorption step (e) is performed on the intermediate reaction mixture, which is obtained at the outlet of a reactor not being the last reactor of the reactor sequence, prior to being subjected to the subsequent reactor of the reactor sequence.
5. The process according to any one of the preceding embodiments, wherein step (b) is performed in a sequence of 2-10 reactors, preferably 2 or 3 reactors.
6. The process according to any one of the preceding embodiments, wherein the reactants and the products of the equilibrium reaction are gaseous at the conditions that apply in the reactor or sequence of reactors, preferably they are gaseous at ambient conditions.
7. The process according to any one of the preceding embodiments, wherein the equilibrium reaction is selected from:

$$N_2 + 3H_2 \leftrightarrow 2NH_3; \tag{1}$$

$$CO + 2H_2 \leftrightarrow CH_3OH; \tag{2a}$$

$$CO_2 + 3H_2 \leftrightarrow CH_3OH + H_2O; \tag{2b}$$

$$CO + 3H_2 \leftrightarrow CH_4 + H_2O \tag{3a}$$

$$CO_2 + 4H_2 \leftrightarrow CH_4 + 2H_2O; \tag{3b}$$

$$CO + H_2O \leftrightarrow CO_2 + H_2; \tag{4}$$

$$2NH_3 + CO_2 \leftrightarrow NH_2COONH_4; \tag{5}$$

$$NH_2COONH_4 \leftrightarrow NH_2CONH_2 + H_2O; \tag{6}$$

$$(2n+1)H_2 + nCO \leftrightarrow H(CH_2)_nH + nH_2O; \tag{7}$$

$$3CO + 3H_2 \leftrightarrow CH_3OCH_3 + CO_2; \tag{8a}$$

$$2CO + 4H_2 \leftrightarrow CH_3OCH_3 + H_2O; \tag{8b}$$

$$2CO_2 + 6H_2 \leftrightarrow CH_3OCH_3 + 3H_2O; \tag{8c}$$

$$CO_2 + H_2 \leftrightarrow CO + H_2O. \tag{9}$$

8. The process according to any one of the preceding embodiments, wherein the target compound is ammonia, methanol or dimethyl ether, preferably ammonia.

DETAILED DESCRIPTION

The process according to the invention is for increasing the productivity of a target compound, wherein the gas-phase conversion towards to target compound is limited by the thermodynamic equilibrium. The process according to the invention comprises:
(a) providing a feed gas to form a reaction mixture comprising reactants;
(b) subjecting the reaction mixture to the equilibrium reaction in a reactor or sequence of reactors, to obtain a reactor outlet mixture comprising the target compound and at least one of the reactants;
(c) regenerating a loaded sorbent obtained in step (e), by flushing the loaded sorbent with the reactor outlet mixture originating from step (b), to obtain regenerated sorbent and an effluent comprising desorbed product of the equilibrium reaction.

(d) separating the effluent originating from step (c) into a product stream comprising the target compound and a reactant stream comprising the reactants and at least one product of the equilibrium reaction;
(e) a sorption step, wherein
  (i) the reactant stream originating from step (d); and/or
  (ii) an intermediate reaction mixture, which is obtained at the outlet of a reactor not being the last reactor of the reactor sequence, prior to being subjected to the subsequent reactor of the reactor sequence,
  is contacted with a sorbent selective for one or more of the products of the equilibrium reaction, to obtain a sorbent loaded with the one or more of the products of the equilibrium reaction and a depleted mixture that, in case step (e) is performed on the intermediate reaction mixture, is subjected to the subsequent reactor of the reactor sequence;

In a first preferred embodiment, referred to as option (i), the reactant stream obtained in step (d) is subjected to step (e). Herein, it is preferred that the depleted mixture obtained in step (e) is mixed with a feed gas in step (a) to form a reaction mixture to be subjected to the equilibrium reaction in step (b). Option (i) is available in case a single reactor is used in step (b) and in case a reactor sequence is used in step (b). The process according to this embodiment can also be defined as comprising:
(a) providing a feed gas to form a reaction mixture comprising reactants;
(b) subjecting the reaction mixture to the equilibrium reaction in a reactor or sequence of reactors, to obtain a reactor outlet mixture comprising the target compound and at least one of the reactants;
(c) regenerating the loaded sorbent obtained in step (e) by flushing the loaded sorbent with the reactor outlet mixture originating from step (b), to obtain regenerated sorbent and an effluent comprising desorbed product of the equilibrium reaction;
(d) separating the effluent originating from step (c) into a product stream comprising the target compound and a reactant stream comprising the reactants and at least one product of the equilibrium reaction;
(e) subjecting the reactant stream originating from step (d) to a sorption step by contacting with a sorbent selective for one or more of the products of the equilibrium reaction, to obtain a sorbent loaded with the one or more of the products of the equilibrium reaction and a depleted mixture.

A second preferred embodiment, referred to as option (ii), is applicable to the situation wherein step (b) is performed in a reactor sequence of at least two reactors. The outlet mixture of a reactor, which is not the last reactor of the sequence, is subjected to step (e), and the depleted mixture obtained in step (e) is intermediate reaction mixture. The process according to this embodiment can also be defined as comprising:
(a) providing a feed gas to form a reaction mixture comprising reactants;
(b) subjecting the reaction mixture to the equilibrium reaction in a sequence of reactors, to obtain a reactor outlet mixture comprising the target compound and at least one of the reactants;
(c) regenerating the loaded sorbent obtained in step (e) by flushing the loaded sorbent with the reactor outlet mixture originating from step (b), to obtain regenerated sorbent and an effluent comprising desorbed product of the equilibrium reaction;

(d) separating the effluent originating from step (c) into a product stream comprising the target compound and a reactant stream comprising the reactants and at least one product of the equilibrium reaction;

(e) subjecting an intermediate reaction mixture to a sorption step by contacting with a sorbent selective for one or more of the products of the equilibrium reaction, to obtain a sorbent loaded with the one or more of the products of the equilibrium reaction and a depleted intermediate reaction mixture, wherein the intermediate reaction mixture is obtained at the outlet of a reactor not being the last reactor of the reactor sequence, and wherein the depleted intermediate reaction mixture is subjected to the subsequent reactor of the reactor sequence.

In an especially preferred embodiment, referred to as option (iii), the process according to the invention contains both the sorption step of option (i) and the adsorption step of option (ii). The process according to this embodiment can also be defined as comprising:

(a) providing a feed gas to form a reaction mixture comprising reactants;

(b) subjecting the reaction mixture to the equilibrium reaction in a sequence of reactors, to obtain a reactor outlet mixture comprising the target compound and at least one of the reactants;

(c1) regeneration of the loaded sorbents obtained in step (e1), to obtain regenerated sorbent and desorbed product of the equilibrium reaction, (c2) regenerating the loaded sorbent obtained in step (e2) to obtain regenerated sorbent and desorbed product of the equilibrium reaction,
wherein at least one of steps (c1) and (c2) is performed by flushing the loaded sorbent with the reactor outlet mixture originating from step (b);

(d) separating the effluents originating from at least the regeneration step (c1) or (c2), which is performed by flushing with the reactor outlet mixture, into a product stream comprising the target compound and a reactant stream comprising the reactants and at least one product of the equilibrium reaction;

(e1) subjecting an intermediate reaction mixture to a sorption step by contacting with a sorbent selective for one or more of the products of the equilibrium reaction, to obtain a sorbent loaded with the one or more of the products of the equilibrium reaction and a depleted intermediate reaction mixture, wherein the intermediate reaction mixture is obtained at the outlet of a reactor not being the last reactor of the reactor sequence, wherein the depleted intermediate reaction mixture is subjected to the subsequent reactor of the reactor sequence;

(e2) subjecting the recycle stream originating from step (d) to a sorption step by contacting with a sorbent selective for one or more of the products of the equilibrium reaction, to obtain a sorbent loaded with the one or more of the products of the equilibrium reaction and a depleted mixture.

The process according to the invention is "for increasing the productivity of equilibrium-restricted reactions", and may also be referred to as "for producing a target compound via equilibrium-restricted reactions" or as "for increasing the yield of the target compound obtained in an equilibrium-restricted reaction". Herein, "producing" may also be referred to as "manufacturing", "making" or "synthesizing".

Equilibrium Reaction

In the context of the present invention, one or more reactants are in equilibrium with one or more products in an equilibrium reaction, preferably this reaction occurs in the gas phase. "Equilibrium reaction" may also be referred to as "equilibrium-restricted reaction". One of the one or more products is the target compound of the process. Typically, at least two reactants are in equilibrium with one or two or more products. The gas-phase conversion of equilibrium reactions is significantly limited by the thermodynamic equilibrium, i.e. the equilibrium conversion is <90% preferably between 5 and 70% and more preferably between 10 and 70%. These equilibrium conversions are typically dependent on the specific reaction conditions, like pressure, temperature, catalyst, molar ratio of the reactants, etc. In one embodiment, two reactants are in equilibrium with one or two products, most preferably one product. Herein, distinct reactants and distinct product refer to distinct molecules, not taking into account the stoichiometry. For example, in the equilibrium reaction for the formation of ammonia according to reaction (1), two reactants ($N_2$ and $H_2$) are in equilibrium with one product ($NH_3$), which is the target compound. A generic exemplary equilibrium reaction could take the form of: a A+b B$\leftrightarrow$c C+d D. Herein, A and B are the reactants, C and D the products, and a, b, c and d the corresponding stoichiometric coefficients. In this hypothetical situation, C is considered to be the desired product or "target compound", whereas D is considered to be the "by-product". Often additional undesired compounds due to a limited selectivity of the reaction, called "side-products", are formed in small amounts. Herein, a-d are real numbers with values dictated by the chemistry. In one embodiment, a-d are positive integers. Typically values in the following ranges: a=1-3, preferably 1-2; b=0-3, preferably 0-1; c=1-3, preferably 1-2; d=0-3, preferably 0-1. Herein, b=0 refers to the situation wherein there is only one reactant, i.e. A. Herein, d=0 refers to the situation wherein there is only one product, i.e. C.

To describe the behaviour of the chemical equilibrium reaction the reaction quotient K is often used:

$$K = \frac{[A]^a [B]^b}{[C]^c [D]^d}$$

Herein, [A] stands for the fugacity of reactant A, [B] stands for the fugacity of reactant B, [C] stands for the fugacity of product C and [D] stands for the fugacity of product D. Under equilibrium conditions the reaction quotient K equals $K_{eq}$. The reaction has not reached equilibrium conversion if $K<K_{eq}$. This can happen after e.g. too short reaction times, too low temperatures, etc.

Inert compounds are those molecules that do not partake in the reaction, and have no advantageous role in the synthesis of the target compound in step (b). However, such compounds may hinder the reaction through catalyst deactivation and when present in larger amounts they increase reactor volume and can slow down conversion rates.

The reactor outlet mixture exiting the reactor typically contains all of A, B, C and D, from which target compound C needs to be isolated. To increase the yield of the synthesis, a recycle is installed, in which A and/or B, typically both, are reintroduced in the reactor after C and D have been removed from this stream. In view of difficult separation steps, the recycle typically contains significant amounts of products C and D in conventional processes. As such, the starting material that enters the reactor, containing the reactant mixture and the recycle, already contains significant amounts of the products, such as 5 mol % ammonia for equilibrium reaction (1) and 5 mol % methanol for equilibrium reaction mixture (2).

In the context of the invention, the equilibrium reaction typically concerns small molecules, preferably gaseous molecules. Thus, in one embodiment, at least the reactants of the equilibrium reaction are under the reaction conditions in the gas phase. Additionally or alternatively, the product(s) of the equilibrium reaction are gaseous under the conditions prevailing of the reaction. In one embodiment, at least the target compound (d) is gaseous. Gaseous refers to the state of the compound at the reaction conditions that are applicable during step (b). In one embodiment, the density of the reactant(s) and product(s) under gas phase conditions is less than 400 kg/m$^3$, preferably less than 300 kg/m$^3$, most preferably less than 200 kg/m$^3$. In one embodiment, the equilibrium reaction is selected from reactions (1)-(9), with the typical target compound indicated, even if water is formed in some reactions as a by-product.

Ammonia: $N_2 + 3H_2 \leftrightarrow 2NH_3$ (1)

Methanol: $CO + 2H_2 \leftrightarrow CH_3OH$ (2a)

Methanol: $CO_2 + 3H_2 \leftrightarrow CH_3OH + H_2O$ (2b)

Methane: $CO + 3H_2 \leftrightarrow CH_4 + H_2O$ (3a)

Methane: $CO_2 + 4H_2 \leftrightarrow CH_4 + 2H_2O$ (3b)

Hydrogen $CO + H_2O \leftrightarrow CO_2 + H_2$ (4)

Ammonium carbamate $2NH_3 + CO_2 \leftrightarrow NH_2COONH_4$ (5)

Urea $NH_2COONH_4 \leftrightarrow NH_2CONH_2 + H_2O$ (6)

Paraffins $(2n+1)H_2 + nCO \leftrightarrow H(CH_2)_nH + nH_2O$ (7)

Dimethyl ether: $3CO + 3H_2 \leftrightarrow CH_3OCH_3 + CO_2$ (8a)

Dimethyl ether: $2CO + 4H_2 \leftrightarrow CH_3OCH_3 + H_2O$ (8b)

Dimethyl ether $2CO_2 + 6H_2 \leftrightarrow CH_3OCH_3 + 3H_2O$ (8c)

Carbon monoxide $CO_2 + H_2 \leftrightarrow CO + H_2O$ (9)

The target compound may be the final compound of the synthesis process, or may be an intermediate in the synthesis of another compound. For example, ammonia, the target compound of reaction (1), may be the final product that is being produced, or may be an intermediate for example in the production of ammonium carbamate in reaction (5). In the context of reaction (7), n may be any value in the range 1-100, preferably 1-20, more preferably 1-10, most preferably 2-6. Although for individual molecules, n should be an integer, typically mixtures are obtained, wherein n refers to the average number of carbon atoms. As such, n can be any value in the here defined ranges. As will be understood by the skilled person, the equilibrium reactions towards methanol in reactions (2a) and (2b) is typically an intermediate reaction between the two extremes (2a) and (2b), of and the exact equilibrium depends in part on the composition the reaction mixture. The same holds for the equilibrium towards methane in reactions (3a) and (3b) and for dimethyl ether in reactions (8a), (8b), and (8c). Herein, the combination of reactions (2a) and (2b), in any ratio, is referred to as reaction (2). Likewise, the combination of reactions (3a) and (3b), in any ratio, is referred to as reaction (3) and the combination of reactions (8a), (8b) and (8c), in any ratio, is referred to as reaction (8). In case the equilibrium reaction is reaction (3), it is preferably reaction (3b).

In a preferred embodiment, the equilibrium reaction is selected from (1), (2), (3), (4), (8) and (9), more preferably from (1), (2), (3) and (9), even more preferably from (1) and (2), most preferably the equilibrium reaction is (1).

Step (a): Forming a Reaction Mixture

In step (a), the reaction mixture that is used for the reaction in step (b) is formed. The reaction mixture comprises at least a feed gas, which delivers reactants to the reaction mixture. In a preferred embodiment, the forming of the reaction mixture in step (a) involves mixing the feed gas with a recycle gas, wherein at least part of, preferably all of, the reactant stream originating from step (d) or the depleted mixture originating from step (e) is used as recycle gas. The feed gas, as referred to in the art as "make-up gas", is the incoming gas for the manufacture of the target compound, and contains the reactants of the equilibrium reaction, and may further contain inert compounds. The recycle gas originates from separation step (d), possibly after sorption step (e), and contains the reactants of the equilibrium reaction, possibly together with some remaining products of the equilibrium reaction and may further contain inert compounds. The mixing of the two gases may occur upstream of the reactor of step (b), such that the combined steams, i.e. the reaction mixture, are introduced as such into the reactor, or the mixing may occur inside the reactor of (b). The latter embodiment typically utilizes two separate inlets for each of the recycle gas and the feed gas. These two distinct inlets are typically placed on the same side of the reactor, preferably at the opposite side as the outlet of the reactor, such that mixing of the two gases occurs effectively in the beginning of the reactor of step (b). Preferably, the mixing occurs upstream of the reactor.

The ratio at which the feed gas and the recycle gas are mixed in step (a) depends on the exact composition of both gases and the specific equilibrium reaction at stake, and can be readily determined by the skilled person. For example, the volumetric ratio feed gas to recycle gas may be in the range of 1/99-50/50, preferably in the range of 5/95-30/70, most preferably 7/93-20/80.

The skilled person is aware of the optimal temperature at which the reaction mixture is introduced into the reactor of step (b). For example, in a preferred embodiment, the reaction mixture is heated before it is introduced in the reactor of step (b). Such heating is advantageous in order to bring the temperature of the reaction mixture close to or on the temperature of the reactor before introduction therein, such that cooling of the reactor upon introduction of the reaction mixture, and loss of efficacy, is minimized. In order to reduce the amount of heating steps, it is preferred that the recycle gas and the feed gas are mixed and then subjected to heating, although it is also possible to heat both gases separately. The heating of the reaction mixture preferably takes place in a heat exchanger, preferably one which is coupled to a process step that requires cooling, preferably the cooling of the reactor outlet stream prior to step (d). Alternatively, especially in case the reaction is an exothermic reaction, the cool (non-heated) reaction mixture is introduced into the reactor, and the reactor and mixture therein is heated automatically be the reaction heat.

Since the reaction mixture is subjected to the reaction in step (b), it must contain the reactant(s) of the equilibrium reaction. Typically, the reaction mixture also contains inert gases and possible traces of product(s) of the equilibrium reaction. Inert gases or inert compounds are defined in the context of the present invention as compounds that have no role in the equilibrium reaction, i.e. not as reactant nor as product, and do not interfere with the equilibrium reaction. Typical inert gases that may be present in the reaction mixture (and elsewhere in the process according to the invention) are selected from $N_2$, the Nobel gases and lower hydrocarbons such as methane, ethane, propane and butane.

Step (b): Reaction

In step (b), the actual equilibrium reaction takes place. This step is also referred to as the reaction or the equilibrium reaction. Thus, the reaction mixture is introduced in a reactor, in which the conditions are such that the reactant(s) is/are partially converted into the product(s) of the equilibrium reaction. The product(s) of the equilibrium reaction includes the target compound and optionally further compounds that are formed together with the target compound. The conversion into the product(s) is generally close to but less than what can be expected on the basis of the thermodynamic equilibrium as can be calculated using the $K_{eq}$. Although these concentrations are dependent on the conditions that apply in the reactor, the mixture that exits the reactor is typically close to or at equilibrium, i.e. both product(s) and reactant(s) are present in the mixture exiting the reactor and $K \leq K_{eq}$, although the process according to the invention as also applicable to situation wherein equilibrium is not completely reached in step (b). The mixture that exits the reactor is referred to as the reactor outlet mixture. The reactor outlet mixture may further contain inert compounds.

Step (b) may occur in a single reactor or in a reactor sequence. In a preferred embodiment, a reactor sequence is used. A reactor sequence contains at least two sequentially aligned reactors, through which the gaseous mixture is transported. Within the context of the present invention, separate reaction beds within a single larger reactor also classify as a reactor sequence, wherein separate reactors refers the separate stages within the reactor each having a separate reactor bed. A reactor sequence comprises at least two reactors; a first reactor (the upstream reactor) and a last reactor (the downstream reactor). One or more additional reactors may be present in between the first and the last reactor. Preferred reactor sequences have 2-10 reactors, more preferably 2-5 reactors, even more preferably 2 or 3 reactors, most preferably 3 reactors. In case step (b) is performed in a reactor sequence, the reaction mixture is introduced in the first reactor and the reactor outlet mixture is obtained at the outlet of the last reactor. The gaseous mixture that is obtained at the outlet of a reactor that is not the last reactor of the reactor sequence, is herein referred to as "intermediate reaction mixture". The intermediate reaction mixture is introduced in the inlet of the subsequent reactor of the reactor sequence, optionally after an additional step such as step (e). The use of a reactor sequence is particularly preferred in case of equilibrium reaction (1), whereas reactions (2)-(9) are preferably performed in a single reactor.

Introduction of the depleted mixture thus either occurs in the first reactor, in the form of a recycle, or in a second or further reactor. As such, the process according to the present invention is compatible with single reactor syntheses as well as syntheses employing multiple reactors in series. In a single reactor process, the sorbent of step (e) is placed in the recycle loop, such the recycle stream is reintroduced in the reactor. In a multiple reactor process, the sorbent of step (e) may also be located in a recycle, for example the recycle to the first or a further reactor, or the sorbent may be located in the connectivity between a reactor not being the last reactor and the subsequent reactor. Such re-subjecting reactants that remain after separation of the target compound to a reactor wherein the same reaction is conducted, either via a recycle or to a further reactor in a multiple reactor set-up, is known in the art, and can be executed as deemed fit by the skilled person Equilibrium reactions are well-known in the art and the skilled person is capable of determining the conditions at which such a reaction should be performed. The actual conditions at which this step is performed is not crucial for the present invention, and are within reach of the skilled person. Preferred equilibrium reactions are discussed above, and the skilled person is aware of the optimal conditions to apply. For example, when equilibrium reaction (1) is being performed in the reactor, the conditions typically include a temperature of 300-550° C. and a pressure of 150-250 bar. In case a reactor sequence is used, the conditions may vary between the different reactors, such that the equilibrium is pushed as much as possible towards the product(s) during the passage of the reaction mixture through all reactors. The skilled person is acquainted with the use of reactor sequences and knows for which equilibrium reactions the use of reactor sequences is preferred over the use of single reactors.

The reactor may contain one or more materials that act as catalyst to facilitate the reaction. This is well-known to the skilled person. The presence of such materials is compatible with the present invention. Catalysts lower the energy barrier for the reactants to be converted into the product(s), and typically do not influence the position of the equilibrium (the equilibrium concentrations), or the value of $K_{eq}$. In one preferred embodiment, the forward formation reaction is exothermic, i.e. the reaction releases energy to the surrounding, typically in the form of heat. As a result the temperature of the outlet of the reactor in step (b) is higher than the inlet temperature. This higher temperature is advantageously used in step (c) to regenerate the sorbent by releasing the adsorbed or absorbed product. The high temperature delivers the required heat to drive this endothermic process, as discussed further below for step (c).

Step (c): Regeneration

In step (c), the loaded sorbent is regenerated. In other words, the sorbed species is desorbed from the sorbent such that the sorbent is capable of sorbing further species. The sorption of step (e) can continue as long as there are sites for sorption available on the sorbent. At some point, the sorbent may become fully saturated with the sorbing species and no further sorption can occur. This is also referred to as breakthrough. Although step (e) may continue until break-through (or even beyond, although that would not further improve productivity or yield), the sorbent may also be regenerated before break-through is reached.

Sorbent regeneration is known in the art, for example from EP 1344561 and WO 2006/034765. Regeneration typically employs a stripping gas, which is led through the loaded sorbent. Molecules of the stripping gas replace the sorbed molecules of the product of the equilibrium reaction, which is thus desorbed. The desorbed product is obtained as stream at the outlet of the sorbent reactor, e.g. sorbent column. This sorbent column product stream may be gaseous or liquid, although a gaseous stream is preferred. As the skilled person appreciates, the exact conditions (temperature, pressure) and nature of the stripping gas that is best used for step (c) depend on the sorbent used, the nature of the sorbed species and the overall process lay-out. In an especially preferred embodiment, the regeneration of step (c) is performed at about the same pressure as sorption step (e).

In a preferred embodiment, regeneration of the sorbent in step (c) is accomplished by flushing the loaded sorbent with hot gases exiting the (sequence of) reactor(s), i.e. the reactor outlet stream. In a preferred configuration, the reactor outlet mixture exiting the reactor of step (b) is first used to regenerate loaded sorbent, i.e. step (c), before it is subjected to step (d), optionally via a cooling step. In doing so, the content of the target compound or other product of the equilibrium reaction in the reactor outlet mixture rises, as such molecules are desorbed from the loaded sorbent and end up in the effluent gas of the regeneration step. This effluent is then subjected to separation step (d), as described above, typically using a condenser, wherein the target compound is removed as product and the recycle stream containing significant amounts of the target product is subjected to sorption step (e). As such, both the sorption of step (e) and the regeneration of step (c) is conveniently incorporated in existing processes for producing target compounds by equilibrium reactions.

The conditions at which step (c) is conveniently performed are known to the skilled person and may differ depending on the specific sorbent and sorbed molecules. The temperature at which step (c) is performed is typically at or close to the outlet temperature of the reactor (sequence) of step (b), although it is also possible to heat the reactor off gas (further) before it is used as stripping gas in step (c). Typically, the temperature of step (c) is within 50° C., more preferably within 20° C. of the reactor outlet temperature. Herein, "within" refers to below or above. In a preferred embodiment, the temperature of step (c) is in the range of −10 to 50° C., preferably in the range of 0 to 30° C., more preferably in the range of 5 to 20° C., above the outlet temperature. In absolute terms, the temperature at which step (c) is performed is preferably in the range of 100-550° C., preferably in the range of 100-500° C., more preferably in the range of 200-400° C.

In a continuous process, it is preferred that two or more columns with sorbent operate in parallel, such that one column is used for step (e), while at least one other column is being regenerated in step (c). Preferably, a third column is present, which has been regenerated and is ready to replace the first column as soon as needed, e.g. near or at breakthrough. Such a set-up of a sorbent column is well-known in the art.

In certain embodiments of the process according to the invention, multiple regeneration steps (c) are present, such as in the context of option (iii) or option (ii) wherein more than one intermediate reaction mixture is subjected to a sorption step (e). These separate regeneration steps may be referred to as steps (c1), (c2), and so on. All said herein for regeneration step (c) in general applies to each of the regeneration steps.

Step (d): Separation

In step (d), the effluent originating from step (c) is separated into a product stream comprising the target compound and a recycle stream comprising the reactant(s) and at least one product of the equilibrium reaction, preferably at least the target compound. Since separation is typically not perfect, the reactant stream will typically still contain all of the products of the equilibrium reaction, including the target compound. In a preferred embodiment, the reactant stream is used as recycle and mixed with the feed gas in step (a), optionally after step (e) in the process according to option (i).

Separation of (one of) the product(s) of an equilibrium reaction, or the target compound, is well-known to the skilled person, and any type of separator known in the art may be employed. Step (d) typically employs a condenser, wherein the reactor outlet mixture originating from step (b) is cooled such that either the reactants and possibly the by-product of the equilibrium reaction or the target compound is condensed and the other fraction remains gaseous, such that the condensed liquid fraction is easily removed from the gaseous fraction. Typically, one or more of the products of the equilibrium reaction is condensed from the gas phase into the liquid phase, while the reactants remain in the gas phase. The gaseous compounds are preferably led to the recycle (to step (a)), optionally via step (e) in the process according to option (i). Because of the vapour pressure, substantial amounts of the products of the equilibrium reaction will remain in the gas phase and thus end up in the recycle or the feed stream of the second or further reactor.

Notably, even if a conventional separation step is performed in between steps (b) and (e), the recycle stream still contains significant amounts of the product(s) of the equilibrium mixture. Difficult separation process between e.g. ammonia and hydrogen/nitrogen hampers efficient and complete separation. Thus, when the sorption step (e) would not be performed, the recycle stream comprising substantial amounts of product(s) of the equilibrium reaction would lead to a composition of the stream introduced in the reactor that is closer to the equilibrium and thus a reduced conversion of reactants to products.

One or more additional processing steps may be performed on the reactor outlet mixture originating from step (b) before it is subjected to step (d). The thus processed mixture is still referred to as originating from step (b). In one embodiment, the reactor outlet mixture is cooled before it is entered into the condenser. Such cooling preferably occurs in a heat exchanger, which is in thermal connection with the heat exchanger used to heat the reaction mixture before being introduced into the reactor (sequence). Further, it is preferred that the reactor outlet mixture is used to regenerate the loaded sorbent in step (c), as defined below, before it is subjected to step (d). If both a cooling step and the regenerating step (c) is performed on the reactor outlet mixture, the order of these steps is not particularly crucial for the present invention, and may depend on the desired conditions for regeneration step (c). In one embodiment, the cooling step is performed downstream of the regeneration step. In an alternative embodiment, the cooling step is performed upstream of the regeneration step. As such, the thermal energy of the of the reactor outlet mixture is put to efficient use, first in regenerating the loaded sorbent, which typically requires elevated temperatures that substantially coincide with the outlet temperature of the reactor of step (b), and secondly in heating the reaction mixture before it is introduced in the reactor (sequence) of step (b).

Step (e): Product Sorption

In step (e), a mixture of reactants and at least one product of the equilibrium reaction is subjected to a sorption step, wherein at least one product of the equilibrium reaction is removed from the mixture by sorption. The sorbent material should be selective for one or more of the products of the equilibrium reaction, meaning that the sorbent remains substantially free from the reactants of the equilibrium reaction during step (e). Further, the sorbent should be capable of sorbing the species to be sorbed, meaning that the sorbent should not be loaded but depleted from sorbed species. In that light, the sorbent to be used in step (e) may also be referred to as a "lean sorbent", "depleted sorbent" or "regenerated sorbent". If inert compounds are present in the mixture according to step (e), these inert compounds may either sorb or not sorb to the sorption material, which is irrelevant for the effect of increasing the productivity of equilibrium-restricted reactions. However, in case the target compound is sorbed by the sorbent, it is preferred that the sorption material does not sorb the inert compounds, such that isolation of the target compound after regeneration of the loaded sorbent is readily achieved. The sorption of step (e) may be adsorption or physisorption, absorption or chemisorption, although adsorption was found to be most preferred. The one or more products of the equilibrium reaction include the target compound. The sorption of step (e) is reversible, such that the loaded sorbent can be regenerated in step (c).

Although the target compound may be the sole product of the equilibrium reaction, such as in the formation of ammonia according to reaction (1), often at least one other compound is co-produced, mostly water is co-produced. Thus, when the equilibrium reaction is reaction (1), the sorbent should be selective for ammonia and not capable of sorbing nitrogen and hydrogen. In case the equilibrium reaction is reaction (2), the sorbent should be selective for methanol and/or water and not capable of sorbing carbon dioxide and hydrogen. In case the equilibrium reaction is reaction (3), the sorbent should be selective for methane and/or water and not capable of sorbing carbon dioxide and hydrogen. In case the equilibrium reaction is reaction (4), the sorbent should be selective for carbon monoxide and/or water and not capable of sorbing carbon dioxide and hydrogen. For any given equilibrium reaction, the skilled person is capable of determining the requirements of sorbent capacity. Herein, "not capable of sorbing" is interpreted as the species in suit remaining substantially unabsorbed by the sorbent. The selectivity of the sorbent for the component i relative to component j is defined as:

$$S_{i,j} = \frac{x_i/y_i}{x_j/y_j}$$

Herein, $y_i$ is the mole fraction of component i in the gas phase, $x_i$ is the mole fraction of sorbed component i, $y_j$ is the mole fraction of component j in the gas phase, $x_j$ is the mole fraction of sorbed component j. The selectivity wherein i is one of the products and j are the reactant(s), is typically at least 5, preferably at least 10, more preferably at least 20, most preferably at least 50. These preferred selectivities apply at the operating conditions of the sorbent.

The advantages of the process according to the invention in terms of increased productivity of the equilibrium reaction are obtained in case in step (e) any one of the products of the equilibrium reaction are sorbed. In doing so, the concentration of the at least one of the products of the equilibrium reaction that is fed into the reactor in step (b) is minimized, and thus more product will be formed in the reactor. Hence, for obtaining the effect in increasing the productivity, it is not crucial that that sorbent is selective for the target compound. In a preferred embodiment, the sorbent is capable of sorbing at least the target compound, most preferably the sorbent is capable of sorbing only the target compound. As such, when the sorbent is regenerated in step (c), the desorbed species provides a further stream of the target compound, as such providing the intended product of the process as an easily accessible product fraction. In an alternative embodiment, the sorbent is capable of sorbing at least the by-product, most preferably the sorbent is capable of sorbing only the by-product. In that case, the target compound may remain in the recycle stream that is subjected again to the reaction in step (b), but since the by-product is removed from the equilibrium mixture, the increase in productivity will also occur. Furthermore, the increased content of target compound in the reactor outlet stream leads to separation of more target compound in step (d), thus also leading to higher yields of target compound.

Such selective sorbents are known in the art. For example, the sorbent selective for ammonia may be selected from materials with an intrinsic nanoporous structure, such as molecular sieves and zeolite-like materials (e.g. chabazite, clinoptilotite, mordenite, ferrierite), activated carbon, $NiCl_2$, $MgCl_2$ and $MnCl_2$. In case the sorbent selective for ammonia is a zeolite, it is preferably of Linde type A (LTA) structure. The zeolite sorbent may for example be selected from zeolite 3A, 4A, 5A and 13X. The sorbent selective for water may be selected from physical sorbents, such as zeolite 3A, 4A, 5A and 13X, as well as chemical sorbents, like base-metal oxides supported on refractory materials, such as calcium oxide, barium oxide or magnesium oxide on alumina, zirconia or cerium-zirconia or magnesium carbonate hydroxide tetrahydrate and pentahydrate and hydrotalcite. The sorbent selective for $CO_2$ may be selected from metal oxides supported on refractory materials, such as calcium oxide, barium oxide or magnesium oxide on alumina, zirconia or cerium-zirconia or magnesium carbonate hydroxide tetrahydrate and pentahydrate and hydrotalcite. Also zeolite-like materials may be used as $CO_2$-selective sorbent. Preferred sorbent selective for $CO_2$ are selected from zeolites and hydrotalcite. The sorbent selective for methanol may be selected from materials with a nanoporous structure, such as molecular sieves and zeolite-like materials, preferably LTA zeolites. Selective sorbents for any of the other possible products of the equilibrium reaction are known to the skilled person. In a preferred embodiment, the sorbent is selected from zeolite 3A, 4A, 5A and 13X.

The recycle stream originating from step (d) and/or an intermediate reaction mixture, which is obtained at the outlet of a reactor not being the last reactor of the reactor sequence, is subjected to sorption step (e). Subjecting only the recycle stream to sorption step (e) is herein referred to as option (i). Subjection only an intermediate reaction mixture to sorption step (e) is herein referred to as option (ii). Subjecting both the recycle stream and an intermediate reaction mixture to a sorption step (e) is herein referred to as option (iii).

In the context of option (ii) and (iii), an intermediate reaction mixture is subjected to sorption step (e). Herein, an intermediate reaction mixture refers to a mixture which is obtained at the outlet of a reactor in the reactor sequence, which is not the last reactor, i.e. not the most downstream reactor of the sequence. An intermediate reaction mixture is obtained at each interval between two reactors, and thus the number of intermediate reaction mixtures equals the number of reactors in the reactor sequence minus one. One or more of the intermediate reaction mixtures can be subjected to a sorption step (e). In one embodiment, one intermediate reaction mixture is subjected to sorption step (e), preferably wherein the last intermediate reaction mixture, i.e. the intermediate reaction mixture obtained at the one but last reactor of the reactor sequence. In an alternative embodiment, more than one intermediate reaction mixture is subjected to sorption step (e), wherein each intermediate reaction mixture is subjected to a distinct sorption step, preferably wherein all intermediate reaction mixtures are subjected to a sorption step. Irrespective whether one or more than one intermediate reaction mixture is subjected to sorption, it is preferred that (at least) the last intermediate reaction mixture, i.e. the intermediate reaction mixture obtained at the one but last reactor of the reactor sequence, is subjected to sorption step (e).

In the context of option (ii), when more than one last intermediate reaction mixture is subjected to sorption, or option (iii), the process according to the invention comprises multiple sorption steps. These may be referred to as steps (e1), (e2), and so on. All said herein for sorption step (e) in general applies to each of the sorption steps.

The contacting of step (e) affords a mixture comprising the reactants and a sorbent loaded with the one or more of the products of the equilibrium reaction. The mixture comprising the reactants may also be referred to as the "cleansed mixture", the "depleted mixture" or the "lean mixture". In the process according to option (i), the depleted mixture may also be referred to as the recycle stream, that is subjected to step (a). This depleted mixture contains all components of the recycle stream originating from step (d) that are not absorbed by the sorbent. In the process according to option (ii), the depleted mixture may also be referred to as the "cleansed intermediate reaction mixture", the "depleted intermediate reaction mixture" or the "lean intermediate reaction mixture", that is subjected to the subsequent reactor of the reactor sequence used in step (b). This depleted mixture contains all components of the intermediate reaction mixture originating from a reactor in step (b) that are not absorbed by the sorbent. This intermediate reaction mixture is reintroduced in a subsequent reactor in step (b).

The present invention thus affords an improved composition for the recycle stream that is reintroduced in the reactor in step (b). Herein, improved composition refers to a composition that contains a lower amount of product(s) of the equilibrium reaction than when step (e) would not be performed. Relatively, the incoming stream thus automatically contains higher concentrations of the reactants. The incoming stream is thus further away from the equilibrium composition, which exits the (sequence of) reactor(s), and thus a higher amount of reactants will be converted into products within the (sequence of) reactor(s). A single pass through the (sequence of) reactor(s) thus gives a higher conversion of reactants into products. As the target compound is a product of the equilibrium reaction, the yield of the target compound is increased.

Equilibrium Reaction (1): Ammonia Production

In a preferred embodiment, the target compound is ammonia ($NH_3$) and the equilibrium reaction is (1). The process according to the present embodiment is for increasing the productivity of $NH_3$ via the equilibrium reaction: $N_2 + 3 H_2 \leftrightarrow 2 NH_3$, the process comprising:
(a) providing a feed gas to form a reaction mixture comprising the reactants $N_2$ and $H_2$;
(b) subjecting the reaction mixture to the equilibrium reaction in a reactor or sequence of reactors, to obtain a reactor outlet mixture comprising the comprising $NH_3$ and at least one of the reactants;
(c) regenerating the loaded sorbent obtained in step (e) by flushing the loaded sorbent with the reactor outlet mixture originating from step (b), to obtain regenerated sorbent and an effluent comprising desorbed product $NH_3$;
(d) separating the effluent originating from step (c) into a product stream comprising $NH_3$ and a reactant stream comprising $N_2$, $H_2$ and $NH_3$;
(e) a sorption step, wherein
  (i) the reactant stream originating from step (d); and/or
  (ii) an intermediate reaction mixture, which is obtained at the outlet of a reactor not being the last reactor of the reactor sequence, prior to being subjected to the subsequent reactor of the reactor sequence,
is subjected to a sorption step by contacting with a sorbent selective for $NH_3$, wherein the sorbent is not capable of sorbing $N_2$ and $H_2$, to obtain a sorbent loaded with $NH_3$ and a depleted mixture comprising $N_2$ and $H_2$ that in case step (e) is performed on the intermediate reaction mixture, is subjected to the subsequent reactor of the reactor sequence.

In one embodiment, the depleted mixture comprising $N_2$ and $H_2$ originating from step (e) is recycled to the reactor (sequence) of step (b). In other words, the sorbent of step (e) is located in the recycle loop. In one embodiment, the depleted mixture comprising $N_2$ and $H_2$ originating from step (e) is an intermediate reaction mixture, which is subjected to the subsequent reactor in the reactor sequence of step (b). By virtue of step (e), the $NH_3$ content in the depleted mixture is reduced.

During conventional ammonia synthesis, the incoming gas of the ammonia reactor (for step (b)) contains about 90 vol % of a recycle and only 10 vol % of feed gas, containing the reactants. The recycle gas contains about 5 vol % ammonia, leading to a 4 vol % ammonia concentration of the gas that is introduced in the reactor. The equilibrium is established at about 13 vol % ammonia, such that only about 8.5 vol % ammonia is formed in a single pass through the reactor. The reactor outlet mixture containing 13 vol % ammonia is conventionally led to the condenser, where ammonia is separated and a recycle stream is formed, which contains about 5 vol % ammonia. In an especially preferred embodiment of the process according the invention, the reactor outlet stream, typically containing about 13 vol % ammonia, is first used as stripping gas to regenerate a sorbent loaded with ammonia in step (c). This leads to an increase of the ammonia concentration to about 20 vol %. This effluent of the regeneration step is led to the condenser, where ammonia is condensed and separated as a product stream. Again, a recycle containing about 5 vol % ammonia is formed, but in view of the higher ammonia concentration in the incoming stream entering the condenser, the amount of ammonia in the product stream is higher. Then, the recycle containing about 5 vol % ammonia is subjected to sorption step (e), where ammonia is sorbed to the sorbent such that the effluent of the sorption step contains only about 1 vol % ammonia. This gas is used for the recycle, such that the amount of ammonia that is introduced in the reactor is advantageously reduced from about 5 vol % to about 1 vol %. A single pass through the reactor in the process of the invention thus allows the formation of about 16 vol % ammonia. A further effect is that the recycle is smaller, meaning that about 85 vol % of the recycle can supplemented with 15 vol % of feed gas to be introduced in the reactor. The increased yield within the reactor combined with the additional ammonia that is removed from the recycle and collected during regeneration gives a yield increase from 11 vol % to about 19 vol %. Such a marked increase is obtainable with the process according to the invention, which does not require any adaptations on the reactor or the catalyst that is been used, but is purely the results of an intermediate sorption/regeneration step.

The inventors demonstrated the effect of introducing a sorption step according to the invention, as is shown in the table below, wherein Conv. refers to the conventional process as outlined above, and Emb. 1-4 refer to four embodiments according to the present invention. All processes contain a sequence of three reactors wherein the ammonia is formed (pressure=100 bar), and a condenser (pressure=5 bar; T=5° C.) which is used to condense all ammonia, except for the 5 vol % of ammonia that remains in the vapour phase. Further, all processes employ a heat exchanger for heating the reaction mixture of feed gas and recycle gas and cooling the reactor outlet gas (after the regeneration step if present). In Emb. 1-4, the catalyst used is any conventional catalyst for ammonia production, e.g. an iron-based catalyst or a ruthenium-based catalyst, and the concentration of $NH_3$ at the outlet of reactor 3 is based on the outlet temperature chosen. Establishing the outlet temperature, based on the intermediate cooling in place and the concentration of $NH_3$ in the feed, is well-known in the art.

|  | Conv. 1 | Emb. 1 | Emb. 2 | Emb. 3 | Emb. 4 |
|---|---|---|---|---|---|
| feed gas/recycle gas (v/v) | 8.5/91.5 | 13/87 | 15.5/84.5 | 8.5/91.5 | 13/87 |
| [$NH_3$] at inlet of reactor 1 (vol %) | 4.5 | 0.85 | 0.85 | 0.9 | 4 |
| Sorption between reactor 1 and 2? | NO | NO | NO | NO | YES |
| [$NH_3$] at outlet of reactor 1 (vol %) | n/a | n/a | n/a | n/a | 10 |
| [$NH_3$] at inlet of reactor 2 (vol %) | n/a | n/a | n/a | n/a | 3 |
| [$NH_3$] at outlet of reactor 3 (vol %) | 13 | 10 | 13 | 5.7 | 13 |
| Outlet T of reactor 3 (° C.) | 450 | 480 | 450 | 550 | 450 |
| Regeneration after reactor outlet? | NO | YES | YES | YES | YES |
| [$NH_3$] after regeneration (vol %) | n/a | 13.8 | 16.5 | 9.4 | 19.5 |
| [$NH_3$] in recycle after condenser (vol %) | 5 | 5 | 5 | 5 | 5 |
| Sorption after condenser? | NO | YES | YES | YES | NO |
| [$NH_3$] in recycle after sorption (vol %) | n/a | 1 | 1 | 1 | n/a |
| single pass conversion (%) | 8.5 | 12.9 | 15.6 | 8.5 | 12.9 |

At similar reactor outlet temperatures, the single pass conversion could be increased from 8.5% (conventional process) to 15.6% (inventive process, option (i)) or 12.9% (inventive process, option (ii)). Emb. 1 shows that even with a higher outlet temperature of the final ammonia synthesis reactor, which lowers the $NH_3$ concentration at that point, compared to the conventional process, the single pass conversion could still be increased. Emb. 1 represents the situation wherein the same heat exchange network within the reactor sequence is in place as for the conventional case. Emb. 2 shows that when the temperature of the outlet of the final ammonia conversion reactor is kept the same, i.e. the heat exchange network within the reactor sequence is upgraded compared to the conventional process, the single pass conversion can almost be doubled. Emb. 3 shows that the outlet temperature can be allowed to reach much higher temperatures compared to the conventional process, which drives the concentration of $NH_3$ in the reactor outlet mixture down from 13 vol % to 5.7 vol %, while keeping the same single pass conversion. In this embodiment, the heat exchange network between synthesis reactors is relaxed, compared to the conventional process. A higher reactor outlet temperature, and thus a higher overall reaction temperature, means that the size of the reactor for the ammonia synthesis can be reduced, because the kinetics of the ammonia conversion are increased by higher temperature.

A similar set of experiments was performed for higher reactor pressure (200 bar) and lower or higher condenser temperature (−5° C. or 30° C.). The resulting single pass conversions are shown in the table below:

|  | Conv. 2 | Emb. 5 | Emb. 6 | Emb. 7 |
|---|---|---|---|---|
| Sorption between reactor 1 and 2? | NO | NO | NO | NO |
| Outlet T of reactor 3 (° C.) | 450 | 450 | 450 | 480 |
| Regeneration after reactor outlet? | NO | YES | YES | YES |
| Condenser T (° C.) | −5 | −5 | 30 | 30 |
| Condenser pressure (bar) | 3.5 | 3.5 | 10 | 10 |
| Sorption after condenser? | NO | YES | YES | YES |
| single pass conversion (vol %) | 22.8 | 24.7 | 27.1 | 22.8 |

Increasing the reactor and lowering the condenser temperature (Conv 2 vs. Conv 1) is known to increase the single pass conversion. Even at such conditions, the process according to the invention was capable of further increasing the single pass conversion, from 22.8 vol % to 24.7 vol %.

Remarkably, operating the condenser at less stringent conditions (T=30° C.) even increased the single pass conversions for the inventive process, because the $NH_3$ content is increased during regeneration, and thus there is more $NH_3$ to condense.

Equilibrium Reaction (2): Methanol Production

In a preferred embodiment, the target compound is methanol ($CH_3OH$) and the equilibrium reaction is (2). The process according to the present embodiment is for increasing the productivity of $CH_3OH$ via the equilibrium reaction: $CO_2 + 3H_2 \rightarrow CH_3OH + H_2O$, the process comprising:
(a) providing a feed gas to form a reaction mixture comprising the reactants $CO_2$ and $H_2$;
(b) subjecting the reaction mixture to the equilibrium reaction in a reactor or sequence of reactors, to obtain a reactor outlet mixture comprising the comprising $CH_3OH$ and $H_2O$ and at least one of the reactants;
(c) regenerating the loaded sorbent obtained in step (e) by flushing the loaded sorbent with the reactor outlet mixture originating from step (b), to obtain regenerated sorbent and an effluent comprising desorbed product $H_2O$ and/or $CH_3OH$;
(d) separating the effluent originating from step (c) into a product stream comprising $CH_3OH$ and a reactant stream comprising $CO_2$, $H_2$, $H_2O$ and $CH_3OH$;
(e) a sorption step, wherein
  (i) the reactant stream originating from step (d); and/or
  (ii) an intermediate reaction mixture, which is obtained at the outlet of a reactor not being the last reactor of the reactor sequence, prior to being subjected to the subsequent reactor of the reactor sequence,
is subjected to a sorption step by contacting with a sorbent selective for $H_2O$ and/or $CH_3OH$, wherein the sorbent is not capable of sorbing $CO_2$ and $H_2$, to obtain a sorbent loaded with $H_2O$ and/or $CH_3OH$ and a depleted mixture comprising $CO_2$ and $H_2$ that, in case step (e) is performed on the intermediate reaction mixture, is subjected to the subsequent reactor of the reactor sequence.

In one embodiment, the depleted mixture comprising $CO_2$ and $H_2$ originating from step (e) is recycled to the reactor (sequence) of step (b). In other words, the sorbent of step (e) is located in the recycle loop. In one embodiment, the depleted mixture comprising $CO_2$ and $H_2$ originating from step (e) is an intermediate reaction mixture, which is subjected to the subsequent reactor in the reactor sequence of step (b). By virtue of step (e), the $H_2O$ and/or $CH_3OH$ content in the depleted mixture is reduced.

The inventors demonstrated the effect of introducing a sorption step according to the invention, as is shown in the table below, wherein Conv. 1 refers to the conventional process as outlined above, and Emb. 1 refers to the embodiment according to the present invention. Both processes contain a reactor wherein methanol is formed (pressure=50 bar), and a condenser (pressure=50 bar; T=50° C.) which is used to condense all methanol, except for the 2.8 wt % of methanol that remains in the vapour phase. Further, both processes employ a heat exchanger for heating the reaction mixture of feed gas and recycle gas and cooling the reactor outlet gas (after the regeneration step if present).

|  | Conv. 1 | Emb. 1 |
| --- | --- | --- |
| feed gas/recycle gas (v/v) | 20/80 | 20/80 |
| [$CH_3OH$] at inlet of reactor 1 (wt %) | 2.3 | 0.44 |
| [$CH_3OH$] at outlet of reactor 1 (wt %) | 11.6 | 10.24 |
| Outlet T of reactor 1 (° C.) | 290 | 296 |
| Regeneration after reactor outlet? | NO | YES |
| [$CH_3OH$] after regeneration (wt %) | n/a | 11.9 |
| [$CH_3OH$] in recycle after condenser (wt %) | 2.8 | 2.8 |
| Sorption after condenser? | NO | YES |
| [$NH_3$] in recycle after sorption (wt %) | n/a | 0.54 |
| single pass conversion (%) | 12.5 | 13 |

Equilibrium Reaction (3): Methane Production

In a preferred embodiment, the target compound is methane ($CH_4$) and the equilibrium reaction is (3), preferably reaction (3b). The process according to the present embodiment is for increasing the productivity of $CH_4$ via the equilibrium reaction: $CO_2 + 4H_2 \leftrightarrow CH_4 + 2\,H_2O$, the process comprising:

(a) providing a feed gas to form a reaction mixture comprising the reactants $CO_2$ and $H_2$;
(b) subjecting the reaction mixture to the equilibrium reaction in a reactor or sequence of reactors, to obtain a reactor outlet mixture comprising the comprising $CH_4$ and $H_2O$ and at least one of the reactants;
(c) regenerating the loaded sorbent obtained in step (e), by flushing the loaded sorbent with the reactor outlet mixture originating from step (b), to obtain regenerated sorbent and desorbed product $H_2O$ and/or $CH_4$;
(d) separating the effluent originating from step (c) into a product stream comprising $CH_4$ and a reactant stream comprising $CO_2$, $H_2$, $H_2O$ and $CH_4$;
(e) a sorption step, wherein
 (i) the reactant stream originating from step (d); and/or
 (ii) an intermediate reaction mixture, which is obtained at the outlet of a reactor not being the last reactor of the reactor sequence, prior to being subjected to the subsequent reactor of the reactor sequence,
 is subjected to a sorption step by contacting with a sorbent selective for $H_2O$ and/or $CH_4$, wherein the sorbent is not capable of sorbing $CO_2$ and $H_2$, to obtain a sorbent loaded with $H_2O$ and/or $CH_4$ and a depleted mixture comprising $CO_2$ and $H_2$ that, in case step (e) is performed on the intermediate reaction mixture, is subjected to the subsequent reactor of the reactor sequence.

In one embodiment, the depleted mixture comprising $CO_2$ and $H_2$ originating from step (e) is recycled to the reactor (sequence) of step (b). In other words, the sorbent of step (e) is located in the recycle loop. In one embodiment, the depleted mixture comprising $CO_2$ and $H_2$ originating from step (e) is an intermediate reaction mixture, which is subjected to the subsequent reactor in the reactor sequence of step (b). By virtue of step (e), the $H_2O$ and/or $CH_4$ content in the depleted mixture is reduced.

Equilibrium Reaction (9): Carbon Monoxide Production

In a preferred embodiment, the target compound is carbon monoxide (CO) and the equilibrium reaction is (9). Reaction (9) is known as the reverse water gas shift (rWGS) reaction. The process according to the present embodiment is for increasing the productivity of CO via the equilibrium reaction: $CO_2 + H_2 \leftrightarrow CO + H_2O$, the process comprising:

(a) providing a feed gas to form a reaction mixture comprising the reactants $CO_2$ and $H_2$;
(b) subjecting the reaction mixture to the equilibrium reaction in a reactor or sequence of reactors, to obtain a reactor outlet mixture comprising the comprising CO and $H_2O$ and at least one of the reactants;
(c) regenerating the loaded sorbent obtained in step (e) by flushing the loaded sorbent with the reactor outlet mixture originating from step (b), to obtain regenerated sorbent and desorbed product $H_2O$ and/or CO;
(d) separating the effluent originating from step (c) into a product stream comprising CO and a reactant stream comprising $CO_2$, $H_2$, $H_2O$ and CO;
(e) a sorption step, wherein
 (i) the reactant stream originating from step (d); and/or
 (ii) an intermediate reaction mixture, which is obtained at the outlet of a reactor not being the last reactor of the reactor sequence, prior to being subjected to the subsequent reactor of the reactor sequence,
 is subjected to a sorption step by contacting with a sorbent selective for $H_2O$ and/or CO, wherein the sorbent is not capable of sorbing $CO_2$ and $H_2$, to obtain a sorbent loaded with $H_2O$ and/or CO and a depleted mixture comprising $CO_2$ and $H_2$ that, in case step (e) is performed on the intermediate reaction mixture, is subjected to the subsequent reactor of the reactor sequence.

In one embodiment, the depleted mixture comprising $CO_2$ and $H_2$ originating from step (e) is recycled to the reactor (sequence) of step (b). In other words, the sorbent of step (e) is located in the recycle loop. In one embodiment, the depleted mixture comprising $CO_2$ and $H_2$ originating from step (e) is an intermediate reaction mixture, which is subjected to the subsequent reactor in the reactor sequence of step (b). By virtue of step (e), the $H_2O$ and/or CO content in the depleted mixture is reduced. The inventors found that the process according to the present invention, according to option (i), increased the single pass conversion into CO from 25% to 28%.

The invention claimed is:

1. A process for increasing the productivity of a target compound via an equilibrium reaction, wherein one or more reactants are in equilibrium with one or more products, one of which being the target compound, the process comprising: (a) providing a feed gas to form a reaction mixture comprising reactants; (b) subjecting the reaction mixture to the equilibrium reaction in a reactor or sequence of reactors, to obtain a reactor outlet mixture comprising the target compound and at least one of the reactants; (c) regenerating the loaded sorbent obtained in step (e), by flushing the loaded sorbent with the reactor outlet mixture originating from step (b), to obtain regenerated sorbent and an effluent comprising desorbed product of the equilibrium reaction; (d) separating the effluent originating from step (c) into a product stream comprising the target compound and a reactant stream comprising the reactants and at least one product of the equilibrium reaction; (e) a sorption step, wherein (i) the reactant stream originating from step (d); and/or (ii) an intermediate reaction mixture, which is obtained at the outlet of a reactor not being the last reactor of the reactor sequence, prior to being subjected to the subsequent reactor of the reactor sequence, is contacted with a sorbent selective for one or more of the products of the equilibrium reaction, to obtain a sorbent loaded with the one or more of the products of the equilibrium reaction and a depleted mixture that, in case step (e) is performed on the intermediate reaction mixture, is subjected to the subsequent reactor of the reactor sequence; wherein the sorbent cycles between steps (e) and (c).

2. The process according to claim 1, wherein the reactant stream originating from step (d) or the depleted mixture originating from step (e) is a recycle stream which is mixed with the feed gas in step (a) to form the reaction mixture.

3. The process according to claim 1, wherein the sorption step (e) is performed on the reactant stream prior to step (a).

4. The process according to claim 1, wherein the sorption step (e) is performed on the intermediate reaction mixture, which is obtained at the outlet of a reactor not being the last reactor of the reactor sequence, prior to being subjected to the subsequent reactor of the reactor sequence.

5. The process according to claim 1, wherein step (b) is performed in a sequence of 2-10 reactors.

6. The process according to claim 1, wherein the reactants and the products of the equilibrium reaction are gaseous at the conditions that apply in the reactor or sequence of reactors.

7. The process according to claim 1, wherein the equilibrium reaction is selected from:

$$N_2 + 3H_2 \leftrightarrow 2NH_3; \tag{1}$$

$$CO + 2H_2 \leftrightarrow CH_3OH; \tag{2a}$$

$$CO_2 + 3H_2 \leftrightarrow CH_3OH + H_2O; \tag{2b}$$

$$CO + 3H_2 \leftrightarrow CH_4 + H_2O \tag{3a}$$

$$CO_2 + 4H_2 \leftrightarrow CH_4 + 2H_2O; \tag{3b}$$

$$CO + H_2O \leftrightarrow CO_2 + H_2; \tag{4}$$

$$2NH_3 + CO_2 \leftrightarrow NH_2COONH_4; \tag{5}$$

$$NH_2COONH_4 \leftrightarrow NH_2CONH_2 + H_2O; \tag{6}$$

$$(2n+1)H_2 + nCO \leftrightarrow H(CH_2)_nH + nH_2O; \tag{7}$$

$$3CO + 3H_2 \leftrightarrow CH_3OCH_3 + CO_2; \tag{8a}$$

$$2CO + 4H_2 \leftrightarrow CH_3OCH_3 + H_2O; \tag{8b}$$

$$2CO_2 + 6H_2 \leftrightarrow CH_3OCH_3 + 3H_2O; \tag{8c}$$

$$CO_2 + H_2 \leftrightarrow CO + H_2O. \tag{9}$$

8. The process according to claim 1, wherein the target compound is ammonia, methanol or dimethyl ether.

9. The process according to claim 8, wherein the target compound is ammonia.

10. The process according to claim 7, wherein the equilibrium reaction is (1).

11. The process according to claim 5, wherein step (b) is performed in a sequence of 2 or 3 reactors.

12. The process according to claim 1, wherein the reactants and the products of the equilibrium reaction are gaseous at ambient conditions.

* * * * *